(12) United States Patent
Skaggs et al.

(10) Patent No.: US 9,139,262 B1
(45) Date of Patent: Sep. 22, 2015

(54) OBJECT TRANSPORTATION AND REORIENTATION APPARATUS

(71) Applicant: The Boeing Company, Chicago, IL (US)

(72) Inventors: Kirk D. Skaggs, Kent, WA (US); Gregory W. Swanson, Burien, WA (US)

(73) Assignee: The Boeing Company, Chicago, IL (US)

( * ) Notice: Subject to any disclaimer, the term of this patent is extended or adjusted under 35 U.S.C. 154(b) by 99 days.

(21) Appl. No.: 13/975,006

(22) Filed: Aug. 23, 2013

(51) Int. Cl.
*B63B 35/30* (2006.01)
*B65G 47/24* (2006.01)
*H01F 41/00* (2006.01)

(52) U.S. Cl.
CPC ............... *B63B 35/30* (2013.01); *B65G 47/24* (2013.01); *H01F 41/00* (2013.01)

(58) Field of Classification Search
USPC ....... 212/79, 82; 220/631; 222/463; 248/143; 254/94; 280/47.12; 294/68.26, 68.27; 414/419, 421, 754, 756, 758, 766, 768, 414/769, 770, 773, 777, 778, 779, 780, 782, 414/919
See application file for complete search history.

(56) References Cited

U.S. PATENT DOCUMENTS

| | | | |
|---|---|---|---|
| 970,884 A * | 9/1910 | Carter | 242/129.6 |
| 1,139,636 A * | 5/1915 | Calhoun | 280/5.24 |
| 1,288,138 A * | 12/1918 | Nicoson | 269/74 |
| 1,534,346 A * | 4/1925 | White | 280/47.12 |
| 1,866,887 A * | 7/1932 | Gleason et al. | 280/47.12 |
| 2,910,304 A * | 10/1959 | Caylor | 280/47.131 |
| 3,022,995 A * | 2/1962 | Sorenson et al. | 269/55 |
| 3,702,660 A * | 11/1972 | Berger | 414/778 |
| 3,862,695 A * | 1/1975 | Elliott | 414/448 |
| 4,315,711 A * | 2/1982 | Koscho | 211/49.1 |
| 4,491,334 A * | 1/1985 | Tarbell | 280/47.12 |
| 4,498,841 A * | 2/1985 | Wickstrom | 414/778 |
| 4,594,048 A * | 6/1986 | Sipla | 414/678 |
| 4,671,725 A * | 6/1987 | Evans et al. | 414/137.1 |
| 5,046,912 A * | 9/1991 | Bostrom et al. | 414/358 |
| 2011/0182711 A1 * | 7/2011 | Holloway | 414/777 |

OTHER PUBLICATIONS

Morse Manufacturing Company, Drum Cradles to move and position drum, http://morsedrum.com/products/drum-cradles.htm, Jul. 30, 2013.

* cited by examiner

*Primary Examiner* — Gregory Adams
(74) *Attorney, Agent, or Firm* — Kunzler Law Group, PC (57) ABSTRACT

Described herein is an apparatus for transporting and reorienting an object on a base surface includes a first header coupled to a first side of the object, and a second header coupled to a second side of the object. The object is between the first and second headers. Each of the first and second headers includes a first flat surface that is contactable with the base surface for supporting the object in a first orientation, a second flat surface that is contactable with the base surface for supporting the object in a second orientation, and a curved surface that couples the first and second flat surfaces. The curved surface is contactable with the base surface as the object transitions between the first and second orientations. A radius of curvature of the curved surface is based on a position of a center of gravity of the object.

15 Claims, 9 Drawing Sheets

OBJECT TRANSPORTATION AND REORIENTATION APPARATUS

GOVERNMENT LICENSE RIGHTS

This invention was made with government support under AWACS Contract No. F19628-01-D-0016-0080 awarded by the U.S. Air Force. The government has certain rights in the invention.

FIELD

This disclosure relates to transporting and reorienting objects, and more particularly to devices for manually rolling over an object.

BACKGROUND

Across several industries, such as oil and gas, mining, aerospace, automotive, electronics, and manufacturing, the transportation and reorientation of large, often heavy, objects may be required. Various methods, techniques, and devices have been used to accommodate the transportation and reorientation of objects. In certain applications, complex machinery can be used to lift, transport, and reorient objects. Examples of complex machinery include hydraulically-powered machines, such as hydraulic lifts, or other complex devices. Due the complexity of many heavy machines used for lifting, transporting, and reorienting objects, such machines are prone to breaking down, thus requiring frequent maintenance and repair. Additionally, the complexity of such machines adds to the costs associated with the purchase of the machines and training of personnel to use the machines.

Other methods and techniques include manually lifting, transporting, and reorienting the objects without extraneous devices. Obviously, such brute-force methods and techniques used to lift, transport, and reorient objects introduce the possibility of many negative side effects, such as musculoskeletal ailments, fatigue, and serious injury.

Some extraneous devices for facilitating manual lifting, transporting, and reorienting objects without the use of complex machinery are known. Examples of such extraneous devices include dollies, hand trucks, carts, cradles, and the like. Certain traditional manually-driven devices may be configured to roll an object over, or reorientation an object between two different orientations, however, they suffer from various shortcomings. For example, many extraneous devices are not equipped to comply with manual lifting or roll-over regulations (e.g., Occupational Safety and Health Administration (OSHA) standards) for large and heavy objects. Such devices may meet the lifting regulations at certain instances (e.g., near the initiation of rotation) during a transition of an object from a first orientation to a second orientation. However, such devices do not account for the position of the center of gravity of the object, and thus fail to meet the lifting regulations at other instances (e.g., near the conclusion of rotation) during the transition. Accordingly, the use of these types of extraneous devices may promote a rapid and unexpected increase in the overturning momentum of an object in transition, which can dangerously and strenuously impact the user.

SUMMARY

The subject matter of the present application has been developed in response to the present state of the art, and in particular, in response to the problems and needs associated with lifting, transporting, and reorienting heavy objects that have not yet been fully solved by currently available methods, apparatus, and systems. Accordingly, the subject matter of the present application has been developed to provide manually-driven methods, apparatus, and systems for lifting, transporting, and reorienting objects, which overcomes at least some of the above-discussed shortcomings of prior art methods, apparatus, and systems.

According to one embodiment, an apparatus for transporting and reorienting an object on a base surface includes a first header coupled to a first side of the object, and a second header coupled to a second side of the object. The object is between the first and second headers. Each of the first and second headers includes a first flat surface that is contactable with the base surface for supporting the object in a first orientation, a second flat surface that is contactable with the base surface for supporting the object in a second orientation, and a curved surface that couples the first and second flat surfaces. The curved surface is contactable with the base surface as the object transitions between the first and second orientations. A radius of curvature of the curved surface is based on a position of a center of gravity of the object.

In some implementations, the radius of curvature of the curved surface is such that when any radius of the curved surface at a point in contact with the base surface is substantially parallel to a vertical axis extending through a center of gravity of the object, an offset between the radius and the vertical axis is less than a predetermined threshold associated with a maximum lay down limit. The offset can be approximately zero.

According to certain implementations, each of the first and second headers can include a substantially rectangular-shaped panel. Each of the first and second headers can include a panel and at least one first flange and at least one second flange coupled to the first and second headers, and supporting the object. The at least one first flange supports a third side of the object and the at least one second flange supports a fourth side of the object. The first and second flanges extend substantially transversely away from the respective panels.

In some implementations, the apparatus includes a retention device that is coupled to the first and second headers and secured about the object. The first flat surface, second flat surface, and curved surface of each header are contiguous. The object may include a lowermost portion such that when the first and second header are coupled to the object, the lowermost portion is substantially directly adjacent the curved surface. The first flat surface can be longer than the second flat surface. A radius of curvature of the curved surface may decrease along the length of the curved surface from the first flat surface to the second flat surface According to certain implementations of the apparatus, a horizontal offset between a center of gravity of the object and a point of contact between the curved surface and the base surface remains less than a threshold offset corresponding with a maximum allowed overturning force of the object when coupled to the first and second headers. The radius of curvature of the curved surface can change along a length of the curved surface.

In yet another embodiment, an apparatus for transporting and reorienting an object on a base surface includes an object carrier for supporting the object, and at least one curved surface coupled to the object carrier. The curved surface is contactable with the base surface to facilitate a transition of the object supported by the object carrier between first and second orientations. The curved surface is configured to ensure a horizontal offset between a center of gravity of the object and a point of contact between the curved surface and the base surface is less than an offset threshold as the object transitions between the first and second orientations.

According to some implementations of this embodiment of the apparatus, the curved surface includes a varying radius of curvature along a length of the curved surface. The object carrier includes a first set of wheels for supporting and transporting the object in the first orientation, and a second set of wheels for supporting and transporting the object in the second orientation. The apparatus may include an anti-roll device that is operable to prevent a transition from at least one of the first orientation to the second orientation, or the second orientation to the first orientation. The object carrier includes a first flat panel, a second flat panel, and a retention device that retains the object between the first and second flat panels. The at least one curved surface includes a first and second curved surface. Each of the first and second flat panels includes a respective one of the first and second surfaces.

According to a further embodiment, a method for transporting and reorienting an object on a base surface includes positioning an object carrier on the base surface. The object carrier includes two headers each with a curved surface. The method further includes securing an object between the two headers in a first orientation. Additionally, the method includes rotating the object carrier about the curved surfaces along the base surface such that a center of gravity of the object remains substantially vertically aligned with respective points of contact between the curved surfaces and the base surface, while the object secured between the two headers.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
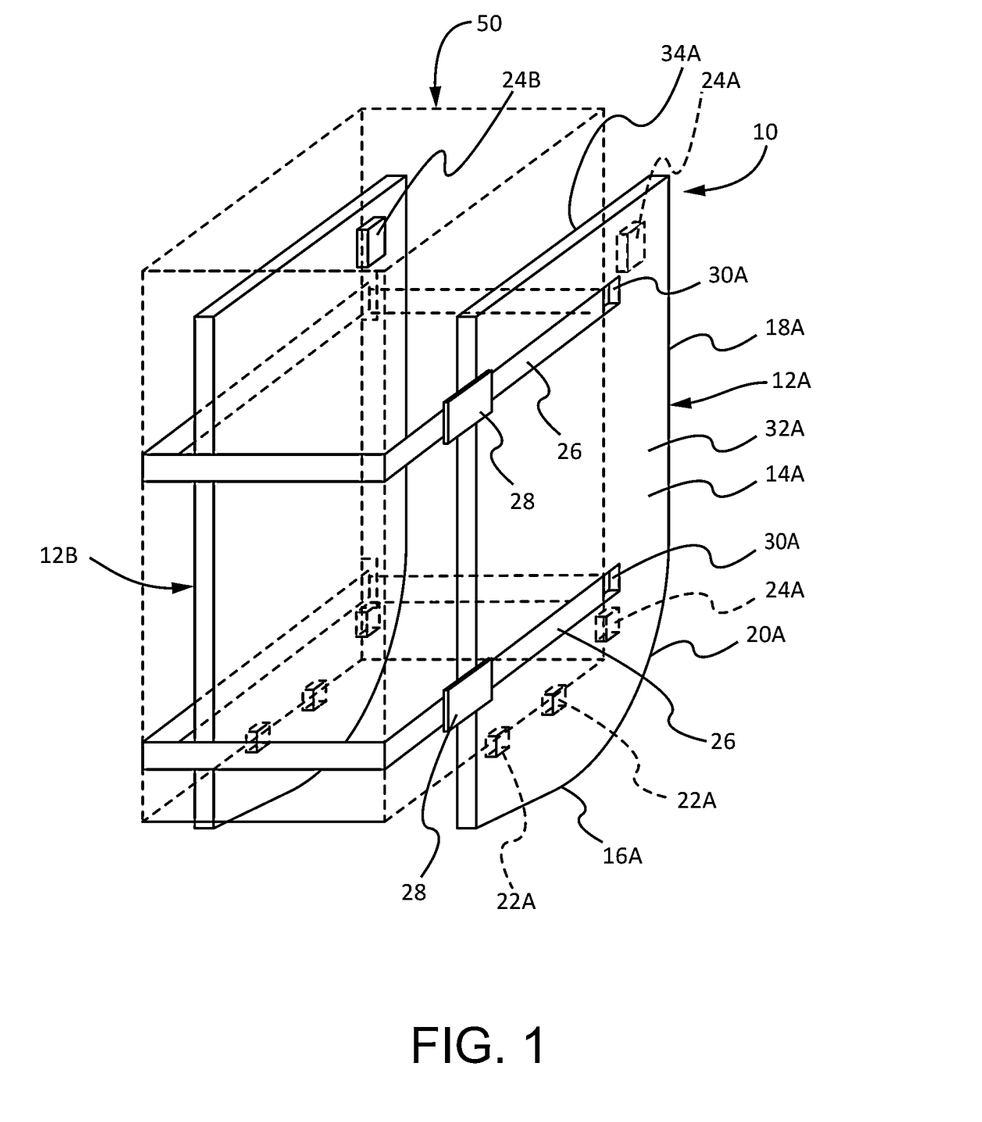
FIG. 1 is a perspective view of an apparatus for transporting and reorienting an object according to one embodiment, with the object shown in hidden lines.

Referring to FIG. 1, one embodiment of a transportation and reorientation apparatus 10 is shown. The apparatus 10 includes first and second headers 12A, 12B, respectively. The first and second headers 12A, 12B have matching features. Therefore, for the sake of clarity, and unless otherwise noted, the details of the features of the first header 12A described herein apply to the matching features of the second header 12A. In other words, the details and features of the second header 12B can be readily understood from the description of the details and features of the first header 12A. Further, when referenced, the matching features of the second header 12B include the same reference numerals as the first header 12B, but with the indicator 'B' following the reference numeral.

Figure 2:
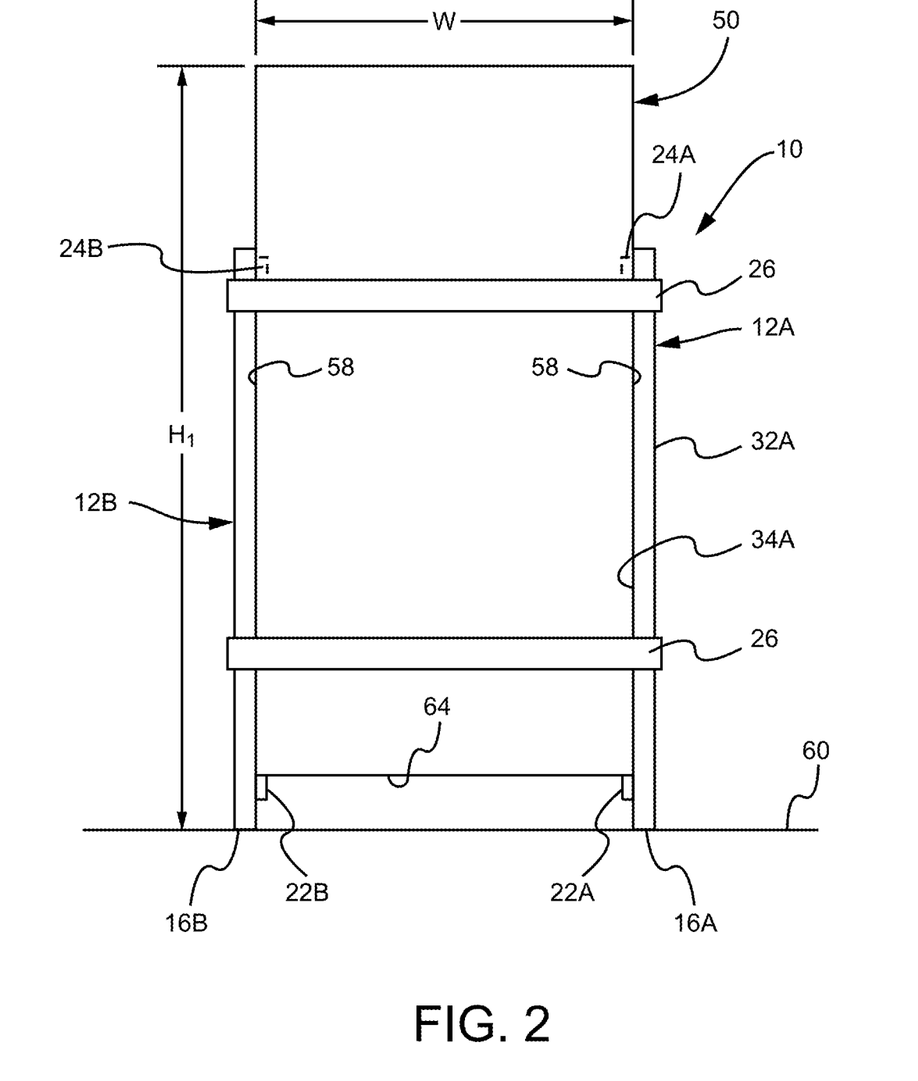
FIG. 2 is a front view of an apparatus for transporting and reorienting an object according to one embodiment, shown with an object in solid lines.

The first and second headers 12A, 12B are spaced apart from each other by a distance equal to a width W of an object 50 being supported by the apparatus 10 (see, e.g., FIG. 2). In the illustrated embodiment, each header 12A, 12B includes a panel 14A. The panel 14A can be defined as an element with relatively flat sides separated by a relatively thin thickness of the element. However, in other embodiments, the panel 14A can have any of variously shaped sides, such as including integrated features for conforming to the shape of the object, and any of various thicknesses between the sides as desired. In the illustrated embodiment, an outer periphery of the panel 14A has a substantially four-sided polygonal shape with three relatively sharp corners and one significantly curved corner. Between the corners are edge surfaces, such as orientation support surfaces that can be flat, and orientation non-support surfaces opposing the support surface that can be flat or non-flat.

The significantly curved corner defines an orientation transition support surface 20A, which acts as a cam surface for facilitating a transition of the object 50 from a first orientation to a second orientation as will be explained in more detail below. The panel 14A includes first and second orientation support surfaces 16A, 18A that adjoin the orientation transition support surface 20A, which extends between the first and second orientation support surfaces. The first and second orientation support surfaces 16A, 18A are substantially flat compared the curved nature of the orientation transition support surface 20A. In this manner, the first orientation support surface 16A can rest on the ground 60 (e.g., a flat base surface) and stably support the apparatus 10 and object 50 in a first orientation (see, e.g., FIG. 3), and the second orientation support surface 18A can rest on the ground and stably support the apparatus and object in a second orientation (see, e.g., FIG. 4). The transitions between the orientation transition support surface 20A and the first and second orientation support surfaces 16A, 18A, respectively, can be substantially smooth and/or seamless. Alternatively, in some implementations, one or more of the transitions (e.g., the transition between the orientation transition support surface 20A and first orientation support surface 16A) can be at least partially sharp or abrupt.

The first and second headers 12A, 12B each includes sets of first flanges 22A, 22B and second flanges 24A, 24B. As shown, the set of first flanges 22A are positioned adjacently along the first orientation support surface 16A in a spaced-apart manner, and the set of second flanges 24A are positioned adjacently along the second orientation support surface 18A in a spaced-apart manner. The flanges 22A, 24A are secured to and extend transversely from an inner support surface 34A of the panel 14A. In this manner, the flanges 22A, 24A of the first header 12A and the flanges 22B, 24B of the second header 12B extend toward each other into the space defined between the inner support surfaces 34A, 34B of the panels. In one embodiment, the flanges 22A, 24A each include a block or protrusion with a respective object support surface. In some implementations, the flanges 22A, 24A are secured to the inner support surface 34A by a fastener using a fastening technique, an adhesive using an adhesion technique, a weldment using a welding technique, or other attachment technique. In yet some implementations, the flanges 22A, 24A are formed integrally with the panel 14A to form a one-piece monolithic construction with the panel.

Figure 3:
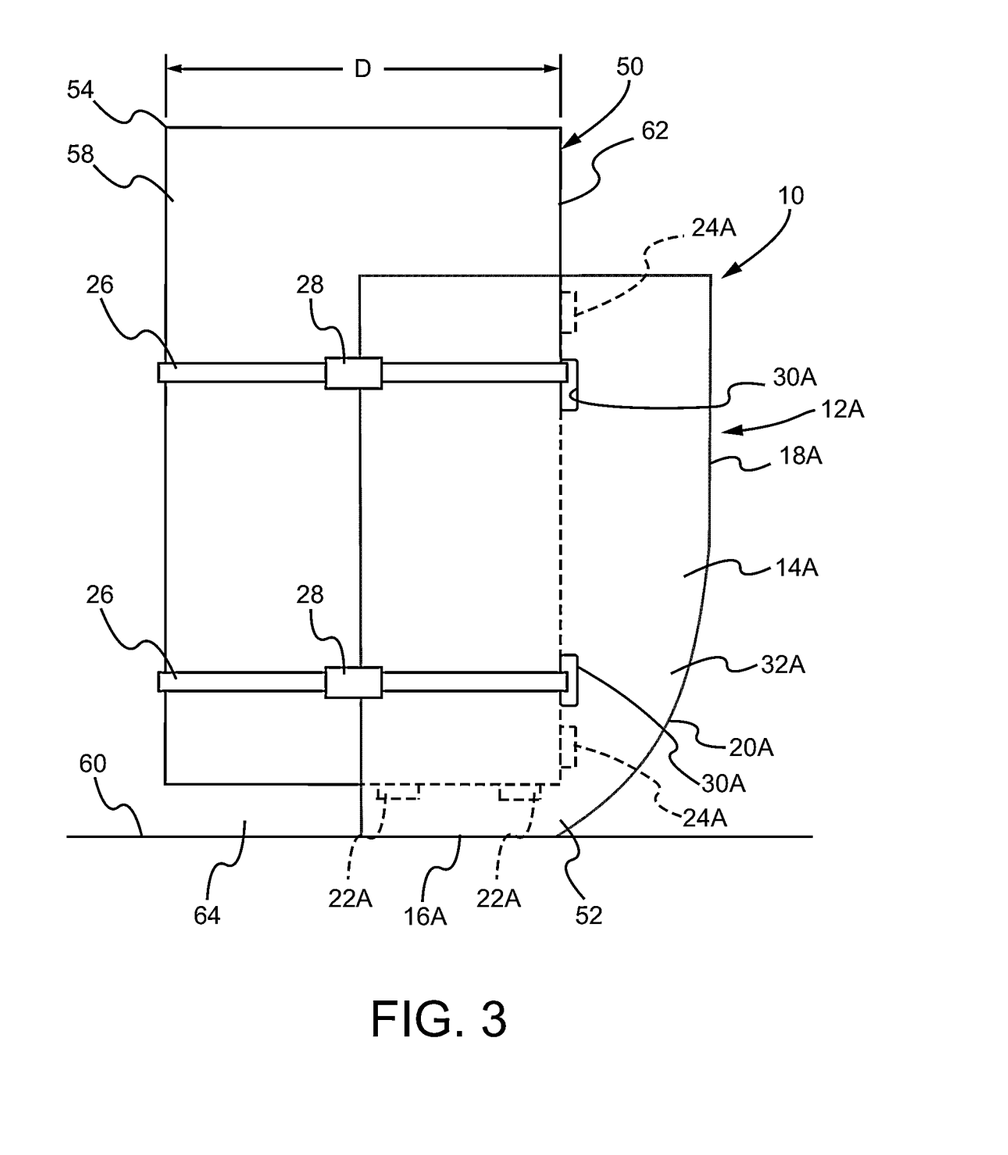
FIG. 3 is a side view of the apparatus of FIG. 2 shown with the object in a first orientation according to one embodiment.
Figure 5:
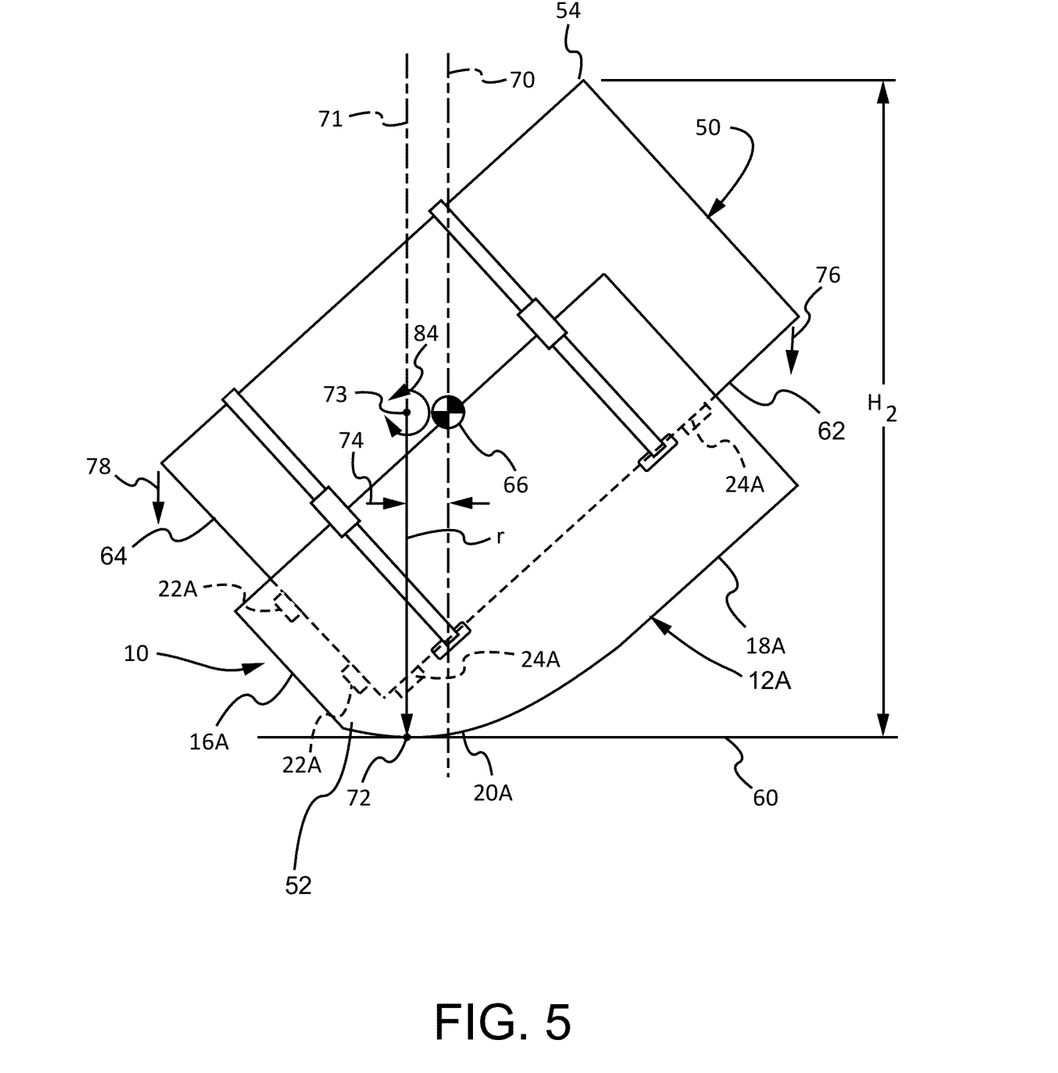
FIG. 5 is a side view of the apparatus of FIG. 2 shown with the object in an intermediate orientation between the first and second orientation according to one embodiment.

The flanges 22A, 24A are strategically positioned and spaced to support the object 50 in a desired position on the header 12A relative to the support surfaces 16A, 18A, 20A. Generally, when coupled to the headers 12A, 12B, the object 50 rests on and is at least partially supported by the flanges 22A, 24A. More specifically, a first supported surface 62 of the object 50 (see, e.g., FIG. 3) rests on and is supported by the flanges 24A, and a second supported surface 64 of the object (see, e.g., FIG. 2) rests on and is supported by the flanges 22A. In the first orientation, the first supported surface 62 is a back surface of the object 50, and the second supported surface 64 is a bottom surface of the object. As shown in FIG. 3, with the flanges 22A, 24A positioned along, but adjacent (e.g., spaced apart from) the first and second orientation support surfaces 16A, 18A, the object 50 is supported between the headers 12A, 12B in a position adjacent (e.g., spaced apart from) the first and second orientation support surface, and the ground 60, when the support surfaces are in contact with the ground. Further, the flanges 22A, 24A are positioned on the header 12A such that an interior edge 52 of the object 50 is positioned radially inwardly of the orientation transition support surface 20. In this manner, the object 50 is effectively suspended above the ground 60 such that no portion of the object contacts the ground when the support surfaces 16A, 18A, 20A are in contact with the ground. However, in some implementations, as shown in FIG. 5, the flanges 22A, 24A are positioned on the header 12A such that an interior edge 52 of the object 50 is positioned just radially inward of the orientation transition support surface 20 such that a maximum diagonal height $H_2$ of an exterior edge 54 of the object from the ground 60 during a transition from the first orientation to the second orientation is reduced (e.g., minimized). In such implementations, the apparatus 10 can be used to overturn tall objects 50 within limited vertical constraints.

The object 50 is retained or secured onto the flanges 22A, 24A and between the headers 12A, 12B by one or more retention devices 26 coupled to the first and second headers, and secured about the object. In the illustrated embodiment, the apparatus 10 includes two spaced apart retention devices 26, but can include fewer or more than two retention devices if desired. Each retention device 26 can be a flexible strap that forms a loop about the object 50. Each strap extends through a respective anchor 30A or aperture formed in the panel 14A to couple the straps to the panels. Further, the straps can be tightened partially about the object 50 and partially about outer surfaces 32A, 32B of the headers 12A, 12B by a respective tightening device 28, which correspondingly tightens the object to the headers 12A, 12B. More specifically, as the straps tighten against the outer surfaces 32A, 32B of the headers 12A, 12B and the object 50, the inner support surfaces 34A, 34B of the headers compress against side surfaces 58 of the object to retain the object between the headers. The tightening device 28 can be any of various devices known in the art, such as a ratcheting mechanism that pulls one end portion of a strap in a direction opposing an opposite end portion of the strap. The tightening device 28 may also include a release mechanism configured to release or loosen the retention device or strap 26 about the headers 12A, 12B and object 50.

Figure 4:
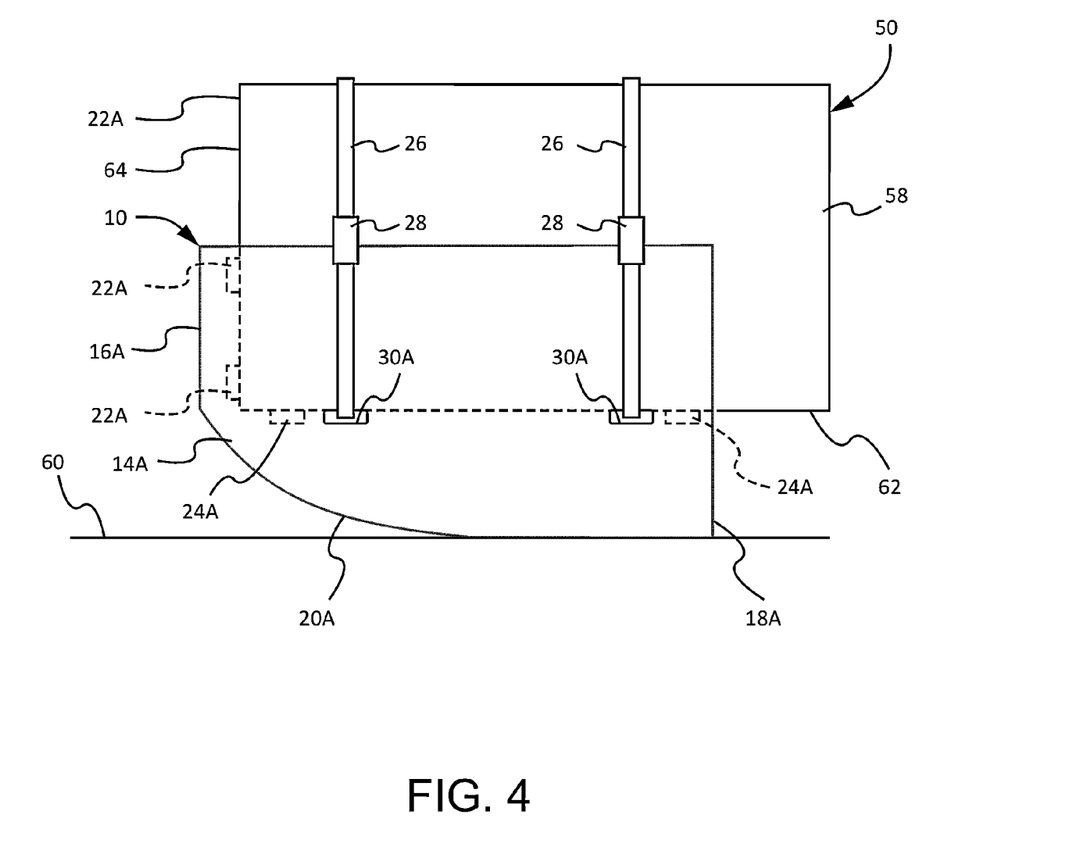
FIG. 4 is a side view of the apparatus of FIG. 2 shown with the object in a second orientation according to one embodiment.

The object 50 can be any of various objects known in the art. For example, in the aerospace industry, the object 50 can be a rectangular cabinet that contains electronic or computer components. Moreover, because the object 50 is rectangular, it has relatively planar sides and ends. As shown, the rectangular object 50 has a height $H_1$ that is greater than a width W and depth D of object. To accommodate the longer height of the object 50, as shown in FIGS. 3 and 4, the second orientation support surface 18A, which is adjacent or parallel to the height $H_1$ of the object, is longer than the first orientation support surface 16A, which is adjacent or parallel to the width W and depth D of the object. Although not necessarily, as shown in FIG. 3, a maximum length of the apparatus 10 can be less than a maximum length (e.g., height $H_1$) of the object 50, such that regardless of the position of the object relative to the headers 12A, 12B, the object extends beyond the vertical confines of the apparatus when the object is in the first orientation (or the horizontal confines of the apparatus when the object is in the second orientation). Similarly, the object 50 can be positioned relative to the headers 12A, 12B such that the object can extend beyond the horizontal confines of the apparatus when the object is in the first orientation (or the vertical confines of the apparatus when the object is in the second orientation).

In some embodiments, the object 50 can have a shape other than rectangular, and a size with vertical and/or horizontal dimensions that are smaller than the respective vertical and horizontal constraints of the apparatus 10. In such embodiments, the position and configuration of the flanges 22A, 24A, as well as the size and shape of the header 12A if desired, can be adjusted to accommodate the shape and size of the object.

The configuration of the orientation transition support surface 20A of the header 12A is based on the position of the center of gravity (CG) 66 of the object when retained by the apparatus 10. Referring to FIG. 5, the CG 66 of the object 50 can be predetermined based on any of various measurement or estimation techniques known in the art. In the illustrated embodiment, the curvature of the orientation transition support surface 20A corresponds with the position of the CG 66 of the object 50. Generally, the radius of curvature of the orientation transition support surface 20A is selected such that a radial vertical axis 71, defined by a radius r of the orientation transition support surface 20A at the point of contact 72 between the orientation transition support surface 20A and the ground 60, is coaxial with a CG vertical axis 70 extending through the CG 66 of the object 50, or is horizontally (e.g., laterally) offset from the CG vertical axis 70 no more than a predefined offset threshold 74. Preferably, the ground 60 defines a horizontal surface, and the radial vertical axis 71 extends perpendicularly relative to the ground. The radius r of the orientation transition support surface 20A at any point on the orientation transition support surface 20A is defined as the radius of a circle that best fits the curvature of the surface at that point. Or alternatively, the radius r at any point on the orientation support surface 20A extends perpendicularly to a line tangent to the surface at that point. The radius r has a length equal to the radius of the circle, and extends from a center 73 of the circle to the orientation transition support surface 20A. Because the apparatus 10 and object 50 rotate about the center 73 of the circle defined by the radius r, the center 73 defines an axis of rotation extending parallel to the ground 60 and perpendicularly relative to the CG and radial vertical axes 70, 71.

Figure 8:
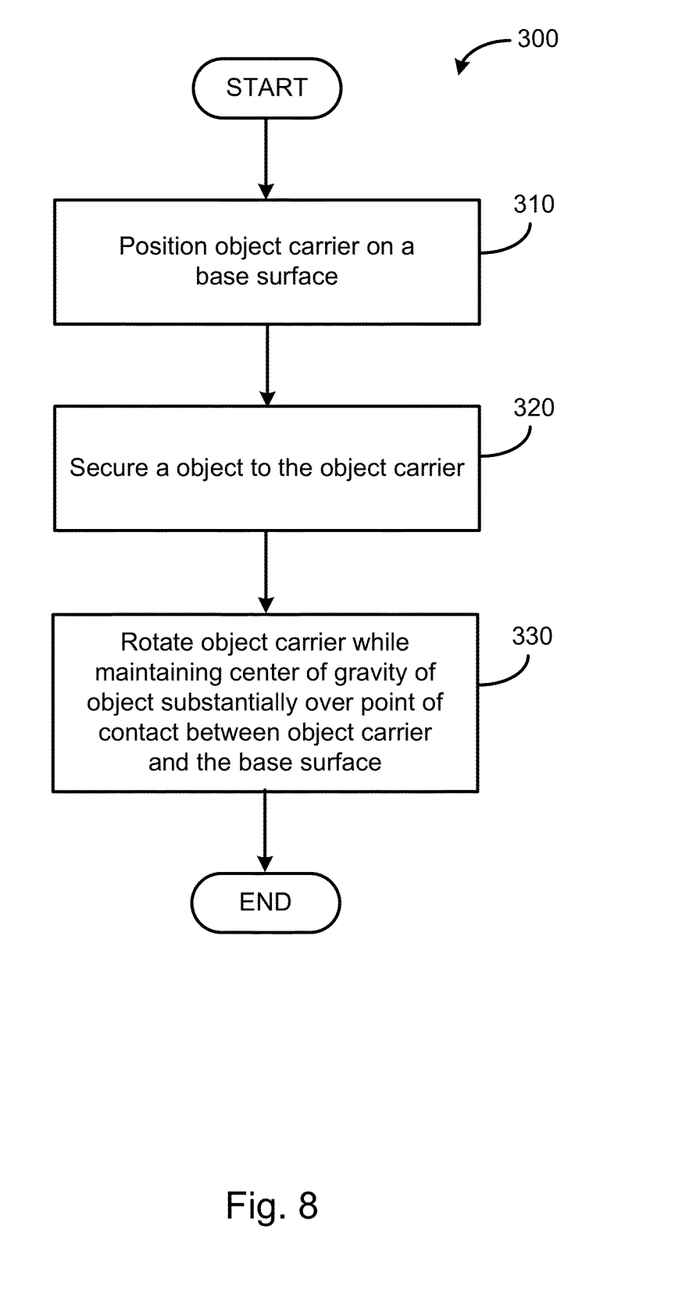
FIG. 8 is a method for transporting and reorienting an object according to one embodiment.

Referring again to FIG. 5, the apparatus 10, and associated object 50 secured to the apparatus, is shown in a transition (e.g., diagonal) orientation between the first and second orientations. For example, FIG. 5 may depict the apparatus 10 in the process of reorienting (e.g., rolling over) the object from the first (e.g., vertical) orientation to the second (e.g., horizontal) orientation, or the second orientation to the first orientation. As depicted in FIG. 8, according to one embodiment, a method 300 for reorienting an object, such as the object 50, includes positioning an object carrier, such as the apparatus 10, on a base surface, such as the ground 60, at 310. An object, such as the object 50, is secured to the object carrier or apparatus 10 at 320, and the object carrier or apparatus is rotated along the orientation transition support surface 20A from one orientation (e.g., vertical orientation (FIG. 1)) to another orientation (e.g., horizontal orientation (FIG. 4)) at 330. In the illustrated embodiment, rotation of the apparatus 10 may include a user or user-assisted tool applying an overturning force or torque to the object 50 sufficient to overcome the rotational inertia of the apparatus and object. The overturning force may be applied by pushing and/or pulling the object 50. Once the rotational inertia of the apparatus 10 and object 50 are overcome, the apparatus rotates as indicated by rotation directional arrows 84 about an axis of rotation corresponding to the center of the circle of the radius r. The initial rotation of the apparatus 10 and object 50 results in the support surface of the apparatus 10 in contact with the ground 60 changing from either the first or second orientation support surface 16A, 18A to the orientation transition support surface 20 as one of the first or second orientation support surfaces lifts off the ground 60, and the other of the first or second orientation support surfaces moves toward the ground. Throughout the reorientation or rotation process, gravity-induced, downwardly-directed forces 76, 78 act on respective end portions of the object separated by the radial vertical axis 71. The forces 76, 78 are associated with the lifting or roll-over forces regulated by OSHA or other similar regulatory agencies or groups.

Depending on the position of the CG 66 of the object 50 relative to the shape of the object, as the apparatus 10 rotates along the orientation transition support surface 20A and about the center 73 of the radius r (or axis of rotation), the lateral or horizontal position of the CG of the object may change in relation to the radial vertical axis 71. In other words, unless the object 50 is symmetrical and the CG 66 of the object 50 is at the geometric center of the object, the lateral position of the CG of the object relative to the radial vertical axis 71 will change. To accommodate the change in the lateral position of the CG 66 as the object 50 rotates, the radius of curvature of the orientation transition support surface 20A correspondingly changes. For example, as shown in FIG. 5 of the illustrated embodiments, the radius of curvature of the orientation transition support surface 20A increases in a direction from the first orientation support surface 16A to the second orientation support surface 18A to accommodate the lateral shift in the position of the CG 66 of the non-symmetrical object 50. The rate of change of the radius of curvature can be dependent upon the position of the CG relative to the object 50. For example, for top-heavy objects with vertically higher CG, the rate of change of the radius of curvature in a first-to-second orientation support surface direction may be lower than for objects with a more centered CG the closer to the second orientation support surface 18A. Basically, the increasing radius of curvature of the orientation transition support surface 20A effectively laterally shifts the center 73 of the radius r to correspond with the lateral shift of the CG 66.

Laterally shifting the axis of rotation in this manner acts to reduce, maintain, or limit the lateral offset between the CG 66 of the object 50 and the axis of rotation. The downward force 76, 78 on the object during a roll-over operation is dependent on the weight of the object 50, and the distance between CG 66 of the object being rotated and the axis of rotation. Generally, the higher the lateral offset between the CG 66 and the axis of rotation of the apparatus and object, the higher the respective downward force 76, 78 on the end portion of the object on the same side of the radial vertical axis 71 as the CG. In other words, the moment arm of the object 50 increases as the CG 66 moves away from axis of rotation. Correspondingly, the lower the lateral offset between the CG 66 and the axis of rotation of the apparatus and object, the lower the moment arm of the object 50, the respective downward forces 76, 78 on the end portion of the object on the same side of the radial vertical axis 71 as the CG, and the overturning forces.

Figure 9:
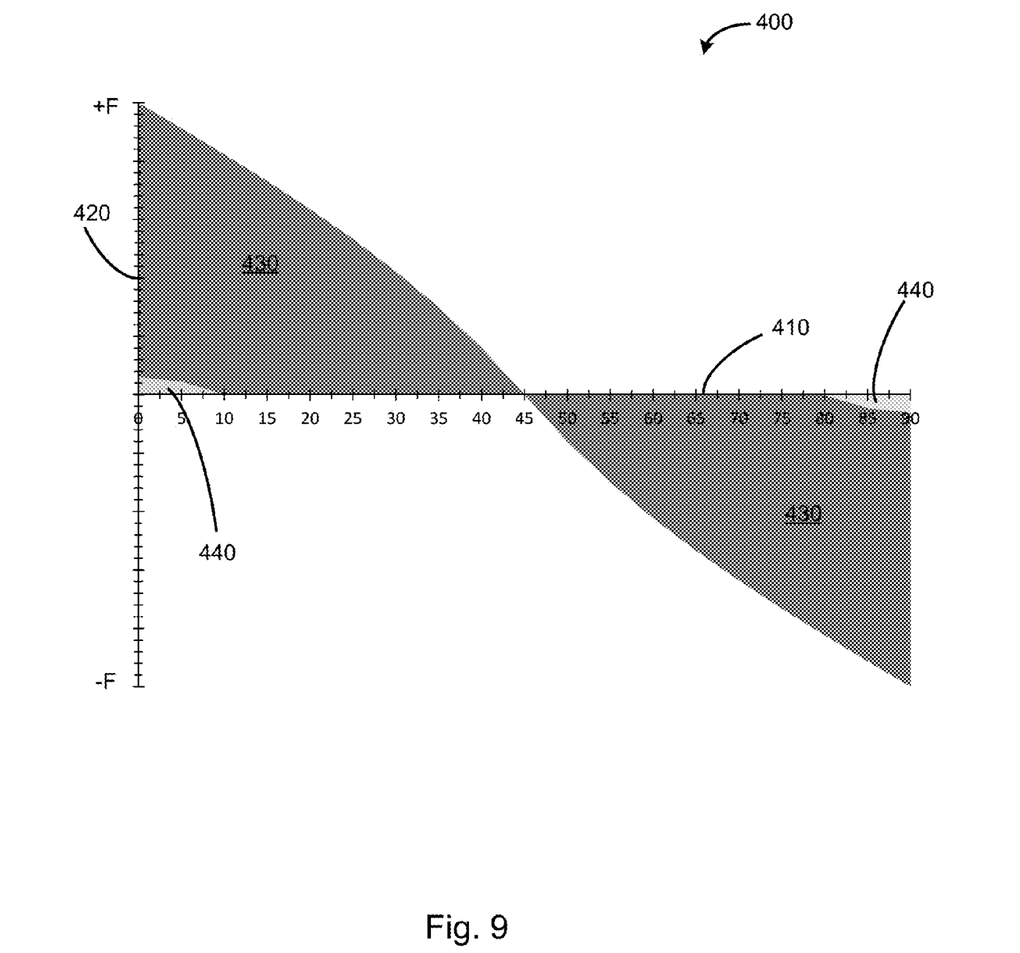
FIG. 9 is a diagram showing overturning force versus rotation of an object with and without a transportation and reorientation apparatus according to one embodiment.

Because the corresponding downward force 76, 78 is less, the overturning force or the force required to counter or overcome the downward forces 76, 78 required to rotate the object is less, and the corresponding physical exertion on the body is less. Therefore, by reducing the lateral offset between the CG 66 and the axis of rotation, a user can rotate large and heavy objects 50 while meeting regulatory lifting and roll-over standards. Referring to FIG. 9, a diagram 400 comparing the overturning force F necessary to rotate an object versus the degree of rotation of the object is shown. The degrees of rotation of the object are shown along the horizontal axis 410 of the diagram 400, and the overturning force F values are shown along the vertical axis 420 of the diagram. Further, the diagram 400 provides a comparison between the overturning forces F necessary to rotate an symmetrical object (e.g., square-shaped object with centralized CG) without the assistance of a transportation and reorientation apparatus of the present disclosure (represented by curve 430) and the overturning forces F necessary to rotate the symmetrical object with the assistance of a transportation and reorientation apparatus of the present disclosure (represented by curve 440). The positive y-axis or +F values represent the overturning forces necessary to overcome one of the downward forces 76, 78, and the negative y-axis or –F values represent the overturning forces necessary to overcome the other of the downward forces 76, 78.

As shown by the curve 430 in the diagram 400, the overturning force +F steadily decreases from a maximum value to zero as the unassisted object is rotated from zero to 45-degrees, and the overturning force –F steadily increases from zero to a maximum value as the unassisted object is rotated from 45-degrees to 90-degrees. The maximum values may correspond with the weight of the object. Accordingly, the application of an overturning force is necessary to rotate an unassisted object throughout the rotation of the object (with the exception of the moment the object is rotated 45-degrees), and the overturning force necessary for rotation is substantial for nearly all rotational orientations of the object during the rotation process. However, in contrast, as shown by the curve 440 in the diagram 400, the transportation and reorientation apparatus, in some embodiments, is configured to minimize the lateral offset between the CG and the axis of rotation such that the overturning force necessary for rotation is zero or close to zero for most of the rotation orientations of the object during the rotation process. Further, the maximum force F required to initiate and complete rotation of the assisted object is substantially less than the maximum force F required to initiate and complete rotation of the unassisted object. Accordingly, significantly less force is required to initiate, maintain, and complete rotation of the assisted object compared to the unassisted object.

For non-symmetrical objects or objects with non-centered CGs, the CG has a tendency to shift from one side of the radial vertical axis 71 to the opposite side of the radial vertical axis as the object is rotated from one orientation to another. Accordingly, as applied to the present embodiment, when rotating the object 50 from the vertical orientation to the horizontal orientation, the lateral offset between the CG 66 and the radial vertical axis 71 transitions from a maximum vertical orientation offset, through a zero offset (e.g., radial vertical axis 71 is coaxial with CG vertical axis 70), and to a maximum horizontal orientation offset. The variability of the radius of curvature of the orientation transition support surface 20A can be configured to maintain the maximum vertical and horizontal offsets under a predetermined maximum offset threshold corresponding with a maximum allowable downwardly-directed force. In some embodiments, the predetermined maximum offset threshold is approximately zero. For example, in certain embodiments of the method 300, rotating the object carrier 330 includes maintaining the CG 66 of the object 50 substantially over the point of contact 72 between the object carrier and the base surface 60. In other embodiments, the predetermined maximum offset threshold is greater than zero and calculated such that the maximum allowable downward forces for the vertical and horizontal offset thresholds do not exceed the capabilities of the lifting or supporting entities. These entities being either human, where physical safety values prescribed by regulating agencies such as OSHA are required, or mechanical devices such as dollies, where design load limits are present Referring to FIG. 6, the apparatus 10 can be configured to facilitate the use of a transport tool 80 for transporting the object 50 while coupled to the apparatus. The transport tool 80 can be any of various devices, such as a cart, with a support surface 82. The transport tool 80, including the support surface 82, can have a width less than a distance between flanges 24A on one header 12A and the flanges 24B on the other header 12B. In this manner, as applied to the illustrated embodiment, the support surface 82 can fit between flanges 24A, 24B to contact and directly support the object 50 in a horizontal orientation (or alternatively, the flanges 22A, 22B to contact and directly support the object in the vertical orientation). In other embodiments, the transport tool 80 and support surface 82 has a width just less than the width W of the object 50 such that the support surface contacts and directly supports the flanges 24A, 24B (and indirectly supports the object 50). The support surface 82 of the transport tool 80 may be mechanically liftable to support the apparatus 10 off the ground 60. When supported on the transport tool 80, the tool can be used to transport the tool to another location.

Figure 6:
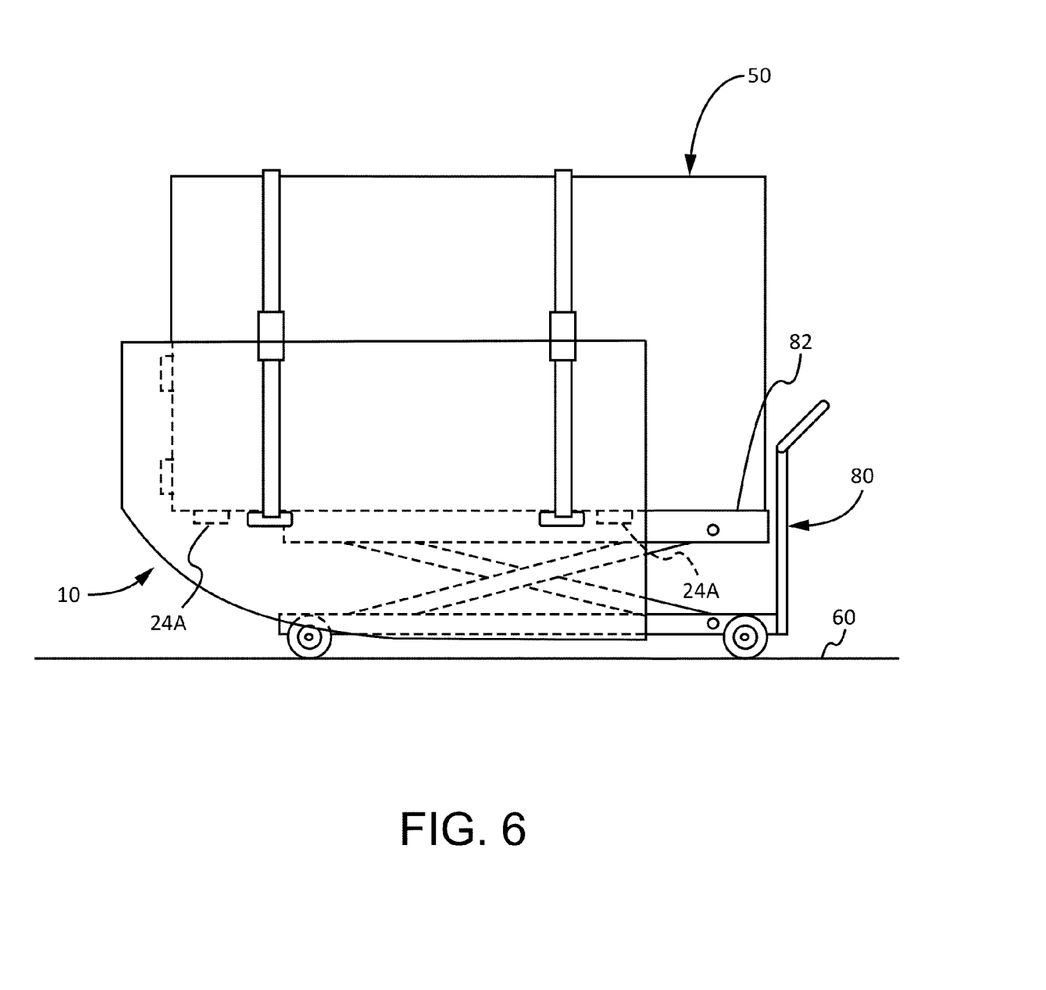
FIG. 6 is a side view of the apparatus of FIG. 2 shown with the object in the second orientation and supported by a transport tool according to one embodiment.

In one specific implementation, the apparatus 10 and object 50 are mounted together on the transport tool 80 in the horizontal orientation as shown in FIG. 6. The transport tool 80 is then moved up to another location, such as through a cargo door into an interior space within an aircraft. The transport tool 80 is then lowered such that the apparatus 10 is positioned directly on the surface of the interior space. Then, the object 50 is lifted to rotate the object as described above until the object is in the vertical orientation within the interior space. Once in the vertical orientation, the apparatus 10 is removed from the object 50 by releasing the tightening device 28 from about the object. In a reversed process, an object in the vertical orientation in a location, such as an interior space within an aircraft, is secured to the apparatus 10. Then the object 50 is pushed to rotate the object as described above until the object is in the horizontal orientation. The apparatus 10 and object 50 are mounted together on the transport tool 80 in the horizontal orientation, and the tool is used to remove the object from the location.

Figure 7:
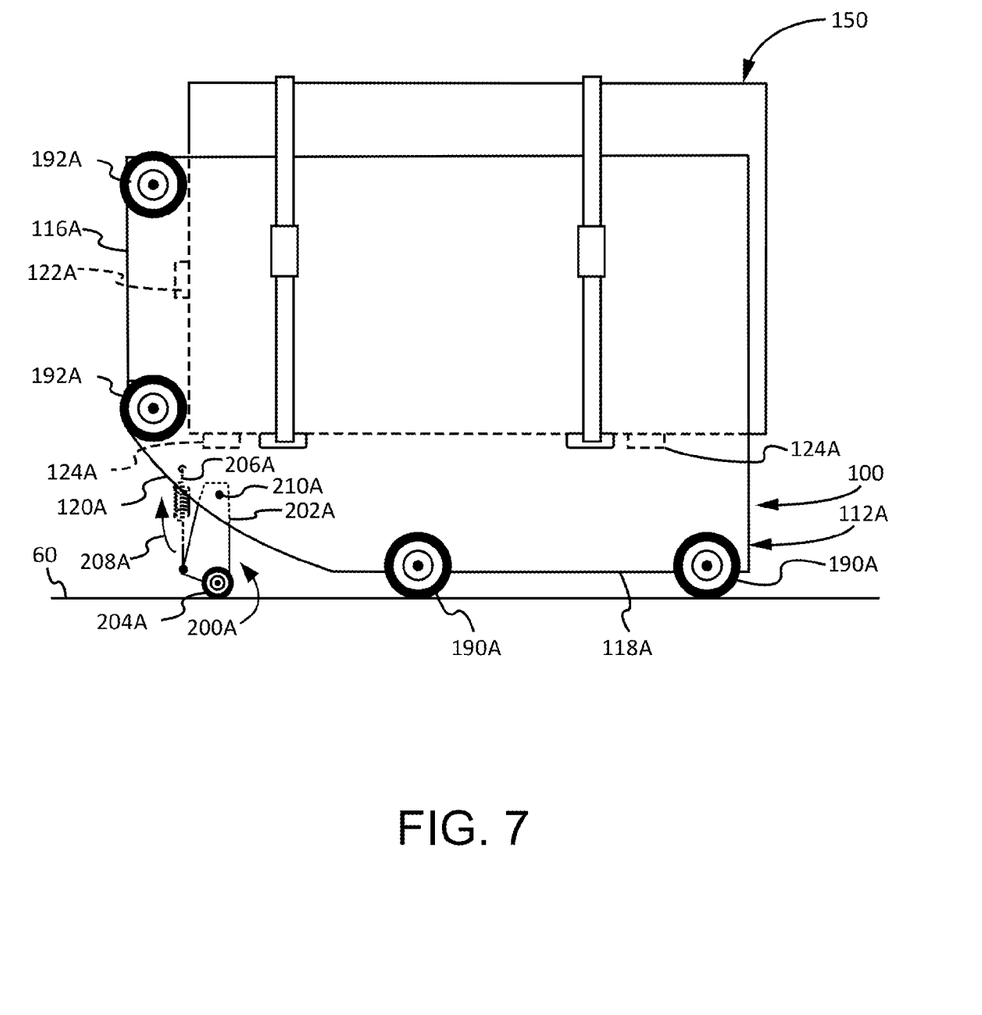
FIG. 7 is a side view of an apparatus for transporting and reorienting an object according to another embodiment with integrated wheels and an anti-roll device.

Referring to FIG. 7, according to another embodiment, an apparatus 100 includes features similar to the apparatus 10, with like numbers referring to like features. However, unlike the apparatus 10, the apparatus 100 includes a plurality of integrated wheels (e.g., wheels 190A, 192A) rotatably coupled to the headers (e.g., header 112A). The wheels 190A are secured to the second orientation support surface 118A, and the wheels 192A are secured to the first orientation support surface 116A. The wheels 190A, 192A facilitate the transportation of the object 150 from one location to another location. Because the wheels are coupled to the support surfaces, the support surfaces do not directly contact the ground, and the wheels provide the contact with the ground. But, the orientation transition support surface 120A is configured to directly contact the ground 60 to facilitate the reorientation of the object 150 as described above.

Also shown in FIG. 7 is an anti-roll device 200A coupled to one or more of the headers 112A, 112B of the apparatus 100. Generally, the anti-roll device 200A is configured to prevent an inadvertent roll-over of the object 150 during transportation of the object while in a specific orientation (such as the horizontal orientation as shown). The anti-roll device 200A includes a base 202A that is swivelable about a pivot point 210A coupled to the header 112A. The base 202A is biased in a first position as shown in FIG. 7 by a biasing element 206A, which can be a spring. Although not shown, a stop may be implemented to prevent further outward rotation of the base 202A in the direction 208A beyond the first position. Further, the anti-roll device 200A includes one or more wheels 204A engageable with the ground 60 to facilitate transportation of the object 150. When engaged with the ground 60, the wheels 204A are positioned laterally closer to the first orientation support surface 116A than the pivot point 210A, such that the pivot point 210A is positioned laterally between the wheels 204A and the wheels 190A. In this manner, when pushing a horizontally-oriented object 150 in a right-to-left direction on the page, the anti-roll device 200A is pushed against the stop and remains extended to prevent rollover in a first rotational direction, as opposed to retracting against the bias of the bias element 206A.

In operation, with the base 202A biased in the first position and maintained in the first position by the stop, the anti-roll device 200A engages the ground 60 to reduce the likelihood or prevent of inadvertent rollover in the first rotational direction during transportation of the object 150 in a desired orientation, such as horizontal. Following transportation of the object 150, the object can be loosened and removed from the apparatus 110. In contrast, when reorienting the object 150 from one orientation (e.g., vertical orientation) to the desired orientation (e.g., horizontal orientation), such as rotating the object 150 in a second rotational direction opposite the first rotational direction, the apparatus 110 rolls along the orientation transition support surface 120A until the anti-roll device 200A contacts the ground 60. The overturning force applied to the object 150 in the second rotational direction, including the weight of the object, is sufficient to overcome the bias of the bias element 206, which in turn forces the anti-roll device 200A to retract inwardly within the confines of the header 112A. In this manner, the anti-roll device 200A retracts to allow the apparatus 110 to rotate in one direction for reorienting the object 150, but extends in the direction 208A to prevent rotation in another opposite direction for transporting the object. Although one type of anti-roll device 200A is shown in FIG. 7, in other embodiments, other types of anti-roll devices may be used.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for transporting and reorienting an object on a base surface, comprising:
a first header coupled to a first side of the object; and
a second header coupled to a second side of the object, the object being between the first and second headers;
wherein each of the first and second headers comprises a first flat surface contactable with the base surface for supporting the object in a first orientation, a second flat surface contactable with the base surface for supporting the object in a second orientation, and a curved surface coupling the first and second flat surfaces, the curved surface being contactable with the base surface as the object transitions between the first and second orientations, wherein the curved surface comprises a varying radius of curvature along a length of the curved surface, wherein respective centers of respective radii of curvature extending from respective points of contact between the curved surface and the base surface remain vertically aligned with a position of a center of gravity of the object as the object transitions between the first and second orientations, wherein the radius of curvature of the curved surface is centered on a rotational axis, wherein the rotational axis intersects the position of the center of gravity of the object as the object transitions between the first and second orientations.

2. The apparatus of claim 1, wherein each of the first and second headers comprises a substantially rectangular-shaped panel.

3. The apparatus of claim 1, wherein each of the first and second headers comprises a panel and at least one first flange and at least one second flange coupled to the first and second headers, and supporting the object.

4. The apparatus of claim 3, wherein the at least one first flange supports a third side of the object and the at least one second flange supports a fourth side of the object.

5. The apparatus of claim 3, wherein the at least one first and second flanges extend substantially transversely away from the respective panels.

6. The apparatus of claim 1, further comprising a retention device coupled to the first and second headers and secured about the object.

7. The apparatus of claim 1, wherein the first flat surface, second flat surface, and curved surface are contiguous.

8. The apparatus of claim 1, wherein the object comprises a lowermost portion, and wherein when the first and second header are coupled to the object, the lowermost portion is substantially directly adjacent the curved surface.

9. The apparatus of claim 1, wherein the first flat surface is longer than the second flat surface.

10. The apparatus of claim 1, wherein the first flat surface is longer than the second flat surface, and wherein the radius of curvature of the curved surface decreases along the length of the curved surface from the first flat surface to the second flat surface.

11. An apparatus for transporting and reorienting an object on a base surface, comprising:
an object carrier for supporting the object; and at least one curved surface coupled to the object carrier, the curved surface being contactable with the base surface to facilitate a transition of the object supported by the object carrier between first and second orientations, wherein the curved surface comprises a varying radius of curvature along a length of the curved surface, wherein respective centers of respective radii of curvature extending from respective points of contact between the curved surface and the base surface intersect a position of a center of gravity of the object as the object transitions between the first and second orientations, wherein the object carrier is fixed relative to the position of the center of gravity of the object as the object transitions between the first and second orientations.

12. The apparatus of claim 11, wherein the object carrier comprises a first set of wheels for supporting and transporting the object in the first orientation, and a second set of wheels for supporting and transporting the object in the second orientation.

13. The apparatus of claim 11, further comprising an anti-roll device operable to prevent a transition from at least one of the first orientation to the second orientation, or the second orientation to the first orientation.

14. The apparatus of claim 11, wherein the object carrier comprises a first flat panel, a second flat panel, and a retention device retaining the object between the first and second flat panels, and wherein the at least one curved surface comprises a first and second curved surface, each of the first and second flat panels comprising a respective one of the first and second surfaces.

15. A method for transporting and reorienting an object on a base surface, comprising:
- positioning an object carrier on the base surface, the object carrier comprising two headers each with a curved surface;
- securing an object between the two headers in a first orientation, wherein the object comprises a center of gravity, wherein a position of the center of gravity is fixed relative to the object, wherein the curved surface of each of the headers has a varying radius of curvature that is based on the object; and
- with the object secured between the two headers, rotating the object carrier about the curved surfaces along the base surface from the first orientation to a second orientation such that the center of gravity of the object remains substantially vertically aligned with respective points of contact between the curved surfaces and the base surface.

* * * * *